United States Patent Office 3,646,223
Patented Feb. 29, 1972

3,646,223
1,4-DIMETHYLOL-1,4-DIALKYL CYCLOHEXANE AND SYNTHESIS
Ralph C. Schreyer, Wilmington, Del., assignor to E. I. du Pont de Nemours and Company, Wilmington, Del.
No Drawing. Filed Apr. 18, 1968, Ser. No. 722,204
Int. Cl. C07c 35/02; C07g 17/08, 22/00
U.S. Cl. 260—617 R     3 Claims

ABSTRACT OF THE DISCLOSURE 1,4-dialkyl-1,4-disubstituted cyclohexanes where the substituent is —$CO_2X$, —$CONX_2$, —$COCl_2$, —$CH_2NH_2$, —CN or $CH_2OH$, X being hydrogen or alkyl of 1–6 carbon atoms, which cyclohexanes are useful as polymer intermediates.

BACKGROUND OF THE INVENTION

Unless otherwise indicated, reference to 1,4-dialkyl-1,4-cyclohexane-difunctional compounds is generic to both the cis and trans isomers of such compounds.

In recent years difunctionally substituted compounds have assumed increasing importance because of their broad utility as polymer intermediates. Diacids and diesters are especially useful in this respect since, after conversion to the corresponding glycols they can be polymerized to the corresponding polyesters and polyamides. These polymers in turn are useful in the formation of fibers, films and molded articles of manufacture.

SUMMARY OF THE INVENTION

The instant invention provides compounds of the general formula

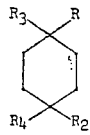

wherein R and R are selected from —$CO_2X$, —$CONX_2$, —COCl, —$CH_2NH_2$ —CN, and $CH_2OH$, X being the same or different and independently selected from hydrogen and alkyl radicals of from 1 to 6 carbon atoms; and $R_3$ and $R_4$ are independently selected from alkyl radicals of 1–4 carbon atoms.

This invention also provides a process for the preparation of these compounds which comprises contacting a compound of the general formula:

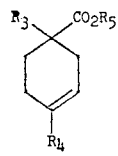

with carbon monoxide in the presence of an acid catalyst, wherein $R_5$ is selected from hydrogen and alkyl radicals of from 1–4 carbon atoms, and $R_3$ and $R_4$ are as defined above.

This invention further provides polymers characterized by the presence in the molecular chain of the recurring structural unit:

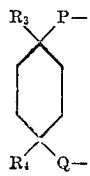

wherein P and Q are selected from

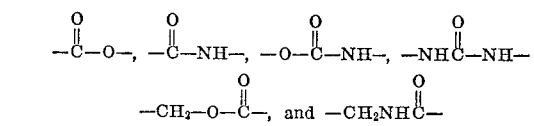
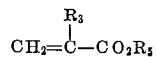

DESCRIPTION OF THE PREFERRED EMBODIMENTS

The starting materials for the process of the instant invention can be prepared by contacting a 1,3-butadiene of the general formula $$CH_2{=}CH-\underset{\underset{R_4}{|}}{C}-CH_2$$

wherein $R_4$ is as defined above, with an acrylic compound of the general formula $$CH_2{=}\underset{\underset{R_3}{|}}{C}-CO_2R_5$$

wherein $R_3$ and $R_5$ are as defined above in the presence of a solvent at elevated temperatures. Such butadienes can include, for example, isoprene; 2-ethyl-1,3-butadiene; 2-propyl-1,3-butadiene and 2-t-butyl-1,3-butadiene; and the acrylic compounds can include, for example, methacrylic acid, ethyl acrylic acid, propyl acrylic acid, butyl acrylic acid, methyl methacrylate, ethyl methacrylate, and methyl ethacrylate.

The molar ratio of the butadiene to acrylic compound is not critical and can vary from about 10:1 to about 1:10. Approximately stoichiometric ratios are preferred for reasons of economy and ease of recovery of the products. The temperature employed in the reaction of the butadiene with the acrylic compound is generally about from 100° to 300° C., and preferably about from 175° to 200° C. The pressure is not critical to the reaction. However, a moderately elevated nitrogen atmosphere is preferred, e.g., of about from 50 to 1000 p.s.i. Contact time for the reaction can vary from about 15 minutes to 24 hours, but the reaction is usually substantially complete in about from 2 to 4 hours.

This reaction proceeds satisfactorily without a catalyst, however, particularly in the case of methyl methacrylate, the use of a Friedel-Crafts catalyst is found to promote a favorable distribution of the 4- and 3-alkyl-3-cyclohexene-1-carboxylate isomers, and the use of such catalyst is therefore preferred. Such catalysts can include, for example, aluminum chloride, ethyl aluminum dichloride, diethyl aluminum chloride, boron trifluoride, and titanium tetrachloride. In the presence of catalytic amounts of aluminum chloride, about 95% of the recovered product is the desired 4-isomer compared to a 70:30 distribution of the 4- to 3-isomers in the absence of a catalyst.

Alternatively, the 1,4 - dialkyl-3-cyclohexenecarboxylic acid starting material can be prepared, for example, by hydrolysis of the adduct formed by reaction of isoprene and methacrylonitrile as well as the selective oxidation of the adduct formed in the reaction between isoprene and methacrolein.

The carbonylation of the starting material is carried out by contacting the 1,4-dialkyl-3-cyclohexenecarboxylic acid or alkyl 1,4-dialkyl-3-cyclohexenecarboxylate, with carbon monoxide and an acidic catalyst. The carbon monoxide can be supplied, for example, as carbon monoxide gas or as a compound which yields carbon monoxide in the acidic solution, such as formic acid and oxalic acid. The acidic catalyst can be selected, for example, from strong mineral acids, for example, those having a pH of <1, such as sulfuric acid, at least 90% concentrated, HF or mixtures of hydrofluoric acid and boron trifluoride. A combination of carbon monoxide gas and 96% sulfuric acid has been found to result in especially high yields and conversions. At least about 5 moles of acid per mole of reactant should be present to obtain good yields and as many as 15 to 20 moles of acid per mole of reactant can be used.

The temperature for the carbonylation is not critical and usually varies about from 0 to 100° C. However, temperatures of about from 20 to 50° C. have been found particularly effective. The pressure is also not critical to the process of the instant invention, and can be any pressure convenient for use with the particular source of carbon monoxide. For example, the pressure can be autogenous when using formic acid or up to about 20,000 p.s.i. when employing carbon monoxide gas. The lowest pressure that will give optimum yields is generally employed for convenience and economy.

The reaction time for the carbonylation varies from about 30 minutes to about 4 hours, depending on the particular reactants and carbonylation conditions; generally, the reaction is complete in 1 to 2 hours.

The resulting 1,4-dialkyl-1,4-cyclohexane diacid or diester can be readily converted to the other derivatives. The corresponding dialkyl ester can be prepared from the diacid by treating the diacid with a lower alkanol, e.g., having 1–8 carbon atoms, such as methanol, ethanol, butanol, and isopropanol, in the presence of a strong mineral acid, for example, sulfuric acid. The corresponding glycols, cis, and trans-1,4-dialkyl-1,4-bis(hydroxymethyl)cyclohexane, can be prepared by hydrogenation of the dialkyl ester using a metal hydride or copper chromite catalyst. The corresponding acid halide, 1,4-dialkyl-1,4-cyclohexane-dicarbonyl halide, is obtained by contacting the diacid with a thionyl halide, such as thionyl chloride or thionyl bromide. The diamide, 1,4-dialkyl-1.4-cyclohexane-dicarboxamide, is obtained by contacting the diester or the acid halide with ammonia. This can be effected, for example, by placing the diester in solution, e.g., with an ether or alcohol, and passing ammonia gas through the solution. Alternatively, the diester can be contacted with an aqueous solutions of ammonium hydroxide, having a concentration, for example, of about from 10 to 30% ammonium hydroxide.

The diamide can be dehydrated to form the corresponding dinitrile. Suitable dehydrating agents can include, for example, thionyl halides such as thionyl chloride or thionyl bromide, phosphorous oxy chloride, pyrophosphate and acetyl chloride. The dehydration can also be accomplished with heat and a solid catalyst such as alumina.

The dinitrile can be hydrogenated at ambient temperatures to the corresponding diamine by contacting it with hydrogen in the presence of a catalyst. Catalysts which have been found especially effective include the noble metal catalysts, e.g., platinum, palladium, and rhodium, Raney nickel catalysts and rhodium-on-nickel catalysts. Solvents for this hydrogenation can include, for example alcohols of from 1–4 carbon atoms, such as methanol and ethanol, chlorinated hydrocarbons such as methylene chloride, and ethers such as isopropyl ether, n-butyl ether, and ethyl ether.

The condensation polymers of the instant invention are derived from 1,4 - dimethyl-1,4-cyclohexanedicarboxylic acid and are characterized by the presence in the molecular chain of the diradical

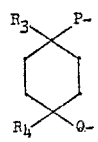

wherein $R_3$, $R_4$, P, and Q are as defined hereinbefore. Polymers in which units of the above diradical are joined by recurring ester and amide groups are found to have especially desirable properties.

Generally, the polymers of the instant invention should have a degree of polymerization of about from 15 to 150, and preferably 20 to 150.

The polyesters of the instant invention comprise solid linear condensation polymers of a dicarboxylic acid and a diol as basic molecular units wherein at least one of said units contains a six-membered cycloaliphatic ring with carboxyl or methyleneoxy groups attached in 1–4 relationship to ring carbon atoms, which ring carbon atoms are also attached to alkyl groups. Any additional constituent of the diol or acid is generally selected from ether oxygen and saturated hydrocarbon groups having a total of up to 8 carbon atoms. The polyester can be composed of a dicarboxylic acid and at least one bifunctional compound reactive with dicarboxylic acids to form linear condensation polymers, at least 50 mole percent of said bifunctional compound consisting of a diol in which two hydroxymethyl groups are attached in 1–4 relationship to a six-membered cycloaliphatic ring, with the point of attachment being a ring carbon atom which is also attached to an alkyl group. The remainder of the bifunctional component may be another dihydroxy compound, a diamine, a diisocyanate, a hydroxy acid, a hydroxy amine, or an amino acid. In another embodiment of the invention the polyester may be composed of a diol and at least one bifunctional compound reactive with diols to form linear condensation polymers, at least 50 mole percent of said bifunctional compound consisting of a dicarboxylic acid containing at least one 6-membered cycloaliphatic ring with the two carboxyl groups attached in 1–4 relationship to ring carbons which are also atached to alkyl groups. The remainder of the bifunctional component may be another dicarboxylic acid, a hydroxy acid, a diisocyanate, or an amino acid.

A preferred embodiment of the invention comprises polyesters characterized by possessing recurring units of one of the following formulas:

(I) 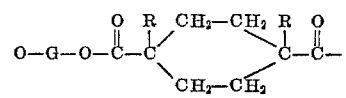

or (II) 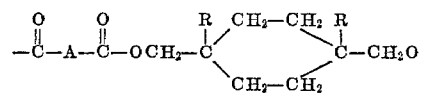

where G is a divalent organic radical obtained by removing the hydroxyl groups from the organic diol G(OH)$_2$ and may be aromatic, aliphatic or cycloaliphatic, A is a divalent organic radical obtained by removing the carboxyl groups from the organic dicarboxylic acid A(COOH)$_2$ and is preferably an aromatic radical, and R is a lower alkyl radical having one to four carbon atoms.

The starting material dicarboxylic acids from which the polyesters are prepared may be in the form of their ester-forming derivatives, i.e., their carbonylhalides, anhydrides, salts, or esters, particularly their esters with the lower aliphatic alcohols or with phenol. Terephthalic acid and 1,2-bis(4-carboxyphenyl)ethane are examples of: dicarboxylic acids A(COOH)$_2$ which may be used with the novel diols to form polyesters, and these acids are indeed particularly preferred for the purpose of producing polyesters suitable for spinning textile filaments. Other examples of suitable acids include bibenzoic acid, bis-4-carboxyphenylsulfoxide, bis - 4 - carboxyphenylether, 1,2-bis(4-carboxyphenoxy) ethane, naphthalene-2,6-dicarboxylic acid, 1,4-bis(4-carboxyphenoxy)butane, 1,4 - bicyclo[2.2.2]octanedicarboxylic acid, hexahydroterephthalic acid, and bis(4-carboxyphenoxy)p-xylene. The divalent radical A is preferably composed primarily of carbon and hydrogen but may contain, in addition to the two carboxyl groups, other non-hydrocarbon components or substituents which are inert in the polyesterification reaction. Mixtures of the dicarboxylic acids may be employed.

Organic diols G(OH)$_2$ suitable for reaction with the novel acids of the invention to form useful polyesters are preferably chosen from the bis(hydroxymethylcyclohexyl) alkanes or bis(hydroxymethylcyclohexyl). Other suitable diols which may be employed include ethylene glycol, propylene glycol, butylene glycol, 2,2-dimethylpropylene glycol, 2,2,3,3,4,4-hexafluoro-1,5-pentanediol, hexamethylene glycol, decamethylene glycol; diethylene glycol, ethylene-dioxydiglycol, cis or trans hexahydro-p-xylylene glycol, cis or trans-quinitol, 1,4-bis(4-hydroxymethylcyclohexyl)cyclohexane, 1,4-bis(3-hydroxypropyl)benzene, 2,6-bis(2-hydroxyethyl)naphthalene, 1,4-bis(2-hydroxyethoxy)benzene, hydroquinone, 4,4'-dihydroxybiphenyl, 2,2-bis(4-hydroxyphenyl)propane, bis(4-hydroxyphenyl)propane, bis(4-hydroxyphenyl)methane, 1,1-bis(4-hydroxyphenyl)ethane, and 1,2-bis(4-hydroxyphenoxy)ethane. Mixtures of diols may be used.

A convenient method for preparing the polymers involves reaction of an alkyl ester of a suitable dicarboxylic acid with a suitable organic diol in an ester interchange reaction followed by polycondensation at high temperature and at low partial pressure of the diol, until a polymer of the desired molecular weight is produced. It is desirable to employ an ester of the dicarboxylic acid formed from an alcohol or a phenol with a boiling point considerably below that of the organic diol so that the former can be removed easily from the reaction zone by distillation. It is preferred to use the methyl or ethyl esters. The ester interchange reaction is advantageously carried out in the presence of ester interchange catalysts such as manganous acetate, calcium acetate, sodium methoxide, sodium hydrogen hexabutoxytitanate, tetraalkyltitanates such as tetraisopropyltitanate, or other suitable ester interchange catalysts as described in the literature relating to preparation of polyesters.

Following the ester interchange reaction, heating is continued under reduced pressure until the excess diol is removed and the polymerization reaction has proceeded to the desired degree. The final stages of polymerization may be carried out with the polymer in the molten state or, if desired, the reaction may be completed by solid-phase polymerization. The polymerization reaction may be carried out in the presence of catalysts such as antimony trioxide, litharge, zinc acetate, or other suitable polycondensation catalyst as described in the literature. Sodium hydrogen hexabutoxytitanate and the tetraalkyl titanates such as tetraisopropylenetitanate are examples of catalysts which may be used for both the ester interchange and polymerization steps.

When the polymer is to be prepared from a dihydric phenol it is suitable to first react the dihydric phenol with acetic anhydride and then use the resulting dihydric phenol diacetate as the starting material for reaction with a suitable dicarboxylic acid. The initial reaction is advantageously carried out in the presence of a catalyst such as sodium acetate.

Homopolyesters having Formula I or II as described above are generally crystalline, high melting and stable to heat and light. Accordingly, they are well suited to the formation of fibers, films and other useful shaped articles prepared by molding and extrusion techniques.

In the examples the expression "polymer melt temperature" (PMT) employed with respect to the products of this invention refers to the minimum temperature at which a sample of the polymer leaves a wet molten trail as it is stroked with moderate pressure across a smooth surface of a heated metal.

The term "intrinsic viscosity," as used in the examples, is defined as the limit of the fraction $$\frac{\ln (r)}{c}$$

as $c$ approaches 0, where $(r)$ is the relative viscosity, and $c$ is the concentration in grams per 100 ml. of solution. The relative viscosity $(r)$ is the ratio of the viscosity of a solution of the polymer in a suitable solvent to the viscosity of the solvent, per se, measured in the same units at 25° C. Intrinsic viscosity is a measure of the degree of polymerization. For the polyesters in the examples, suitable solvents include a mixture of phenol and 2,4,6 - trichlorophenol in a 10/7 by weight ratio, a mixture of trifluoroacetic acid and methylene chloride in a 1/3 by volume ratio, and 100% sulfuric acid.

Additional polymers of the instant invention can be prepared from the novel monomeric compounds of the instant invention by conventional techniques for the formation of condensation polymers. For example, polyamides, polyureas, and polyurethanes can be prepared according to the general reaction procedures set forth in Sorenson and Campbell, Preparative Methods of Polymer Chemistry, New York (1961) on pages 60, 92 and 105, respectively.

In the following examples, which further illustrate the instant invention, parts and percentages are by weight, unless otherwise indicated.

EXAMPLE 1

1,4-dimethyl-1,4-cyclohexanedicarboxylic acid

Part A.—A mixture of 52 parts of methacrylic acid and 85 parts of isoprene is heated in a stirred stainless steel autoclave at 175° C. and under 1000 p.s.i. nitrogen pressure for 2 hours. Distillation of the discharged product under 1–2 mm. vacuum gives 8.5 parts of a fraction I, B.P. 60–100° C., and 53.5 parts of a fraction II, B.P. 105–110° C., which solidify on cooling in Dry Ice. Fraction II recrystallized from n-heptane gives 35 parts of 1,4-dimethyl-3-cyclohexenecarboxylic acid, M.P. 60–61° C. (Literature Value 62–63° C.), in 98% purity. Purity is determined, after converting the acid to the lactone with sulfuric acid, by vapor-phase chromatographic (VPC) analysis using a 5 ft. FFAP column (Wilkens Instrument and Research Inc.). Fraction I was identified as the 1,3-dimethyl isomer.

Part B.—A charge of 25 parts of the adduct, 1,4-dimethyl-3-cyclohexenecarboxylic acid and 230 parts of 96% H$_2$SO$_4$, which had been cooled to 0° C., is stirred in a glass liner at 35° C. and placed in a stainless steel autoclave under 15,000 p.s.i. carbon monoxide pressure for 2 hours. The pressure in the autoclave is then vented and the reaction product poured over 500 parts of ice. A water-insoluble product, identified as the trans-isomer, is filtered off and the water-soluble cis-isomer is recovered by cooling the remaining filtrate to −10° C. and filtering to remove the solid acid. After a twofold extraction with methylene chloride, 31.6 parts of both isomers, about 60% (23.9 parts) trans-1,4-dimethylcyclohexane-1,4-dicarboxylic acid, M.P. 308° C., and about 40% (7.7 parts) cis-1,4-dimethylcyclohexane-1,4-dicarboxylic acid, M.P. 188–189° C., is obtained, giving a 99% conversion and a 97.3% yield. The structures of the products are confirmed by NMR and IR analysis.

Analysis.—Calcd. for C$_{10}$H$_{16}$O$_4$ (percent): C, 60.00; H, 8.00. Found—trans-C (percent): C, 60.46, 60.46; H, 7.73, 7.90. Found—cis-C (percent): C, 59.02, 59.23; H, 7.90, 7.88.

If Part B of Example 1 is repeated, using 1,4-diethyl-3-cyclohexene-carboxylic acid or 1-methyl-4-propyl-3-cyclohexene-carboxylic acid instead of 1,4-dimethyl-3-cyclohexene-carboxylic acid, the products obtained will be, respectively, 1,4 - diethylcyclohexane - 1,4 - dicarboxylic acid and 1 - methyl - 4 - propyl-cyclohexane-1,4-dicarboxylic acid.

EXAMPLES 2–6

In Examples 2–6, 1,4 - dimethyl - 3 - cyclohexene-carboxylic acid is treated with concentrated H$_2$SO$_4$ under varying carbonylation conditions as indicated in the following table to give 1,4-dimethylcyclohexane-1,4-dicarboxylic acid in the yields indicated.

TABLE 1

| Example | Adduct[1] | H$_2$SO$_4$ | CO pressure (p.s.i.g.) | Time (hr.) | Temp. (° C.) | Solid acid[2] | Liquid (lactone)[3] | Solid dibasic acid[2] Conversion | Solid dibasic acid[2] Yield |
|---|---|---|---|---|---|---|---|---|---|
| 2 | 10 | 183 | 1,000 | 2 | 28–30 | 1.5 | 6.1 | 12 | 30 |
| 3 | 10 | 183 | 5,000 | 2 | 30–33 | 5.4 | 4.3 | 42 | 74 |
| 4 | 20 | 183 | 10,000 | 2 | 30–38 | 17.7 | 2.2 | 69 | 77 |
| 5 | 150 | 915 | 12,000 | 2 | 40 | 169.0 | | 90 | 97 |
| 6 | 20 | 183 | 15,000 | 2 | 25 | 21.0 | | 81 | |

[1] 1,4-dimethyl-3-cyclohexenecarboxylic acid.
[2] 1,4-dimethyl-1,4-cyclohexanedicarboxylic acid.
[3] 1,4-dimethyl-2-oxabicyclo[2:2:2]octan-3-one.

EXAMPLE 7

Part A.—80 parts of isoprene, 100 parts of methyl methacrylate, and 7 parts of aluminum chloride are mixed in 175 parts of benzene. The resultant reaction is exothermic and no external heat is applied. The temperature reaches the reflux temperature of isoprene (34° C.) and after four hours reaction time, the resulting mixture is poured into water. Two layers form and are separated. The organic layer is dried over anhydrous magnesium sulfate. Benzene is removed by evaporation and subsequent distillation at 0.9 mm. Hg pressure and 53–60° C. gives 153 parts (~90% yield) of the intermediate adduct in a 9/1 ratio of methyl 1,4- and methyl 1,3-dimethyl-3-cyclohexenecarboxylate.

Part B.—10 parts of the product of Part A and 183 parts of concentrated sulfuric acid are heated to 70° C. and maintained at that temperature for two hours under 12,000 p.s.i.g. carbon monoxide. 7.8 parts (~65% yield) of the desired acid, 1,4-dimethyl-cyclohexane-1,4-dicarboxylic acid, is obtained.

EXAMPLE 8

Cis- and trans-1,4-dimethyl-1,4-bis(carbomethoxy)cyclohexane 100 parts of 1,4-dimethylcyclohexane-1,4-dicarboxylic acid is added to 790 parts of 95% methanol in a round bottom flask, followed by addition of 92 parts of 96% H$_2$SO$_4$. The reaction mixture is heated to reflux (69–71° C.) for 2 hours, then allowed to cool to room temperature and discharged into 2000 parts of distilled water. 101 parts of solid material precipitates. The solid is removed by filtration and the filtrate is then extracted twice with methylene chloride. The methylene chloride extract is dried over anhydrous magnesium sulfate and flash evaporated. 16.7 parts of solid product are obtained after evaporation. The combined products (117.8 parts) are vacuum distilled to give 95% yield (98% conversion) two fractions: at B.P. 130–131.5/5 mm., 67.2 parts of a white solid, trans - 1,4 - dimethyl-1,4-bis(carbomethoxy)cyclohexane, M.P. 98–99° C., and at B.P. 135.3–136.5/5 mm., 42.3 parts of a colorless liquid, cis-1,4-dimethyl-1,4-bis(carbomethoxy)cyclohexane. Compound structures are confirmed by infrared spectrum. The purity of the esters is determined by VPC using a 5-foot FFAP column (Wilkins Instrument and Research Inc.)

Analysis.—Calcd. for C$_{12}$H$_{20}$O$_4$ (percent): C, 63.16; H, 8.77. Found (percent): C, 62.42, 62.59; H, 8.74, 8.83.

EXAMPLE 9

1,4-dimethyl-1,4-bis(hydroxymethyl)cyclohexane

A mixture of 84.5 parts of 1,4-dimethyl-1,4-dicarbomethoxycyclohexane, 84.5 parts of barium-promoted copper chromite catalyst and 400 parts of absolute methanol is hydrogenated at 10,000 p.s.i.g. and 225° C. for 12 hours. Upon completion of the reaction, the catalyst is removed by filtration and after evaporation of the methanol, 60 parts (94% conversion) of a white, crystalline solid is recovered. The solid is identified as a mixture of the cis- (M.P. 124–127° C.) and trans- (M.P. 160–163° C.) isomers or 1,4-dimethyl-1,4-bis(hydroxymethyl)cyclohexane.

EXAMPLE 10

Cis-1,4-dimethyl-1,4-bis(hydroxymethyl)cyclohexane

A mixture of 10 parts of pure cis-1,4-dimethyl-1,4-bis(carbomethoxy)cyclohexane, 15 parts of barium-promoted copper chromite catalyst, and 100 parts of absolute ethanol is hydrogenated at 10,000 p.s.i. and 150° C. for 24 hours in a stainless steel autoclave. The discharged product is filtered from the catalyst and the ethanol evaporated on a steam cone. A portion of the product (4.4 parts) is distilled through an 18° Vigreux to give two fractions: Fraction 1, 1.18 parts of a semi-solid, B.P. 120–125° C./5 mm. and Fraction 2, 1.5 parts of a solid, B.P. 135–140° C./5 mm. Fraction 2 is recrystallized from ether to give 0.35 part, M.P. 124–131° C. The product is identified as 1,4-dimethyl-1,4-bis(hydroxymethyl)cyclohexane by elemental analysis.

Analysis.—Calcd. for C$_{10}$H$_{20}$O$_2$ (percent): C, 69.76; H, 11.63. Found (percent): C, 69.62, 69.71; H, 11.72, 11.56. VPC analysis of the diacetate ester indicated >98% cis content.

EXAMPLE 11

Trans-1,4-dimethyl-1,4-bis(hydroxymethyl)cyclohexane

A mixture of 30 parts of barium-promoted copper chromite catalyst, 15 parts pure trans-1,4-dimethyl-1,4-bis(carbomethoxy)cyclohexane, and 133 parts of absolute ethanol is hydrogenated at 10,000 p.s.i. for 24 hours at 230° C. The discharged product is filtered to remove the catalyst and the solvent removed on a steam cone, giving 12.5 parts of solid material. A portion of the product (2.3 parts) is heated in 214 parts ether and filtered. The undissolved portion (0.73 part) melts at 154–163° C. The product is identified as 1,4-dimethyl-1,4-bis(hydroxymethyl)cyclohexane by elemental analysis.

Analysis.—Calcd. for C$_{10}$H$_{20}$O$_2$ (percent): C, 69.76; H, 11.63. Found (percent): C, 69.63, 69.72; H, 11.61, 11.50. VPC analysis of the product indicated >98% trans content.

EXAMPLE 12

1,4-dimethylcyclohexane-1,4-dicarbonyl chloride

A mixture of 13.6 parts of about 85% trans- and about 15% cis-1,4-dimethyl-1,4-cyclohexanedicarboxylic acid and 40 parts of SOCl$_2$ is stirred at 70–75° C. for 2½ hours. The excess SOCl$_2$ is removed by distillation and further distillation under vacuum gives 1.6 parts of a solid, B.P. 120–140° C./10–12 mm. The solid, after recrystallization from petroleum ether, yields 0.8 part, M.P. 105–110° C. Further recrystallization gives a solid, M.P. 113–114° C. An additional 7 parts of solid, M.P. 105–112° C., are obtained by washing the column out with ether. The product is identified as 1,4-dimethylcyclohexane-1,4-dicarbonyl chloride by elemental analysis.

Analysis.—Calcd. for C$_{10}$H$_{14}$O$_2$Cl$_2$ (percent): C, 50.63; H, 5.91; Cl, 29.95. Found (percent): 50.97, 50.92; H, 5.83, 5.81; Cl, 29.97, 30.15.

EXAMPLE 13

1,4-dimethyl-1,4-cyclohexanedicarboxamide

Ammonia gas is passed into a stirred solution of 0.5 part of the diacid chloride of 1,4-dimethyl-1,4-cyclohexanedicarboxylic acid and 71 parts of ethyl ether for 15 minutes at 25° C. A white solid is filtered from the aqueous solution and warmed with 100 parts of water on a steam cone for 15 minutes. The resulting solid is filtered from the water and washed with ether. After drying in air, 0.11 part of a solid, M.P. 310° C. (uncorrected) is obtained. The product is identified as 1,4-dimethyl-1,4-cyclohexanedicarboxamide by elemental analysis.

*Analysis.*—Calcd. for $C_{10}H_{18}O_2N_2$ (percent): C, 60.6; H, 9.09; N, 14.14. Found (percent): 59.25, 59.30; H, 8.95, 9.11; N, 13.87, 14.03.

EXAMPLE 14

If 1,4 - dimethyl-1,4-cyclohexanedicarboxamide is contacted with thionyl chloride at a temperature of about 100° C., 1,4-dimethyl-1,4-cyclohexanedinitrile is obtained.

EXAMPLE 15

If 1,4-dimethyl-1,4-cyclohexanedinitrile is contacted with hydrogen in the presence of Raney nickel catalyst and ethyl ether solvent, 1,4-dimethyl-1,4-cyclohexanedimethylamine is obtained.

EXAMPLE 16

Preparation of polyester from trans-1,4-dimethyl-1,4-cyclohexanedicarboxylate of 2,2-bis(hydroxyphenyl)propane 2,2 - bis(p - acetoxyphenyl)propane (15.60 parts), 10 parts of trans-1,4-dimethyl-1,4-cyclohexanedicarboxylic acid and 0.074 part of KOAc are placed in a polymer tube fitted with a nitrogen capillary tube. Acidolysis begins when the mixture is heated to 255°. After 2 hrs. and 25 minutes at 255°–265° C., 4.2 ml. of acetic acid has distilled from the reaction mixture. After acidolysis has continued at 287° at atmospheric pressure for another 40 minutes, the pressure is reduced to 0.07 mm. and the polymerization is completed by heating at 285–293°/0.07 for 3 hrs. The resulting polymer is identified as having the following structural formula:

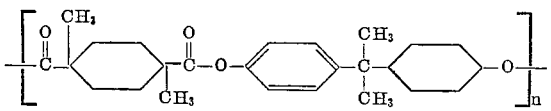

The product is amorphous, melts at 255–265°, is soluble in methylene chloride and has an intrinsic viscosity of 0.96. Stiff, wirey yarn ([η]=0.67) is melt spun at 355°.

Polyester having an intrinsic viscosity of 0.83 is dry spun from 72/25 Triclene®/trifluoroacetic acid (33.5% solids, wt./vol.) to 12 d.p.f. yarn.

EXAMPLE 17

Preparation of polyester from trans-1,4-dimethyl-1,4-cyclohexanedicarboxylic acid and hydroquinone Hydroquinone diacetate (7.51 parts), 7.74 parts of trans-1,4-dimethyl-1,4-cyclohexanedicarboxylic acid and 0.05 part of KOAc are placed in a polymer tube fitted with a capillary tube for supplying nitrogen. The mixture is heated to 245–255° for 1½ hours and then the temperature is raised to 270° for 30 minutes. Next, the pressure is reduced to 0.1 mm. of mercury and the temperature raised to 280–287°. After 3 hours the polymer tube is brought to atmospheric pressure with nitrogen and the polymer allowed to cool. The resulting polyester melts at 355° C., is insoluble in trifluoroacetic acid/methylene chloride (25/75) and has a crystalline X-ray diffraction pattern. Tenacious fibers can be drawn from the melt. The structural formula of the product is:

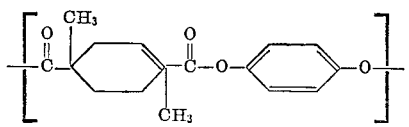

EXAMPLE 18

Polymers of cis/trans (15/85)-1,4-dimethyl-1,4-cyclohexanedicarboxylic acid and 1,2-bis(p-hydroxyphenyl)ethane A polymer tube is charged with 14.90 parts 1,2-bis(p-acetoxyphenyl)ethane, 10.00 parts of 15/85 cis/trans 1,4-dimethyl-1,4-cyclohexanedicarboxylic acid and 0.074 part of potassium acetate and the tube fitted with a capillary force supplying nitrogen. The mixture is heated to 255°, whereupon acetic acid begins to evolve. After 1 hr. at 252°–256° the temperature is raised to 260–273° for 1½ hours. The pressure in the tube is then reduced and the polymerization completed by heating at 285–290°/0.5 mm. mercury for 3 hours. The resulting polymer is insoluble in 25/75 trifluoroacetic acid/methylene chloride, has a melting point of 308° and has a crystalline X-ray diffraction pattern. Tenacious fibers can be drawn from the melt. The structural formula of the product is identified as:

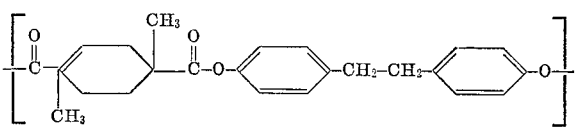

EXAMPLE 19

Preparation of polyester from 1,4-dimethyl-1,4-bis(hydroxymethyl)cyclohexane and terephthalic acid A polymer tube is charged with 12.04 grams of 15/85 cis/trans 1,4 - dimethyl-1,4-bis(hydroxymethyl)cyclohexane and 11.64 grams dimethyl terephthalate. The mixture is heated until melted and then 10 drops of catalyst solution consisting of 12% $NaHTi(OBu)_6$ in n-butyl alcohol is added, and a capillary inserted through which nitrogen is bubbled. Ester interchange is accomplished by consequently heating for ½ hour at 220° C., ½ hour at 230° C., 1 hour at 255° C., and finally ½ hour at 280° C. Then the pressure in the tube is reduced to 0.8 mm. mercury and polymerization continued for 20 hours at 280–285° C. The polymer produced melts at 230° C., has an intrinsic viscosity of 0.92 and a carboxyl value of 0. The second order transition temperature, $T_g$, as determined by differential thermal analysis, is about 110° C.

The structural formula of the recurring unit of the product is identified as:

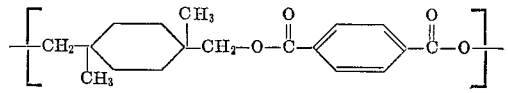

The polymer is melt-spun at 282–287° C. to give a yarn having an intrinsic viscosity of 0.90 and a free carboxyl content of 3.6 equiv./$10^6$ gms. After drawing 1.6× at 140° C. the yarn has a tenacity of 1.7 g.p.d., a break elongation of 12% and an initial modulus of 29 g.p.d.

After mock finishing, the yarn is tested for recovery properties with the following results.

$WR_3WR_5$, 40° C. wet _____ 69/47
$TR_3/TR_5$, 40° C. wet _____ 93/78
TSR, percent _____ 74

"$T_g$," the "second order transition temperature," is defined herein as the temperature at which a discontinuity occurs in the curve of a first derivative thermodynamic quantity with temperature. It is correlated with yield temperature and polymer fluidity and can be observed from a plot of density, specific volume, specific heat, sonic modulus or index of refraction against temperature. A convenient method for determining $T_g$ for a given sample of polymer is given by Pace in his U.S. Pat. 2,556,295 (col. 3, line 24, to col. 4, line 19).

Values of tensile strain recovery (TSR) for a filament are an indication of the wash-wear performance to be expected from garments prepared from such filaments. The TSR of a filament is determined by mounting a 10-inch length of the filament on a tensile tester with recording chart (commercially available from the Instron Engineering Corporation, Quincy, Mass.) and also equipped with a circulating water bath which can be raised and lowered. The water bath, maintained at 40° C., is raised to immerse the filament. After the filament has been immersed for 2 minutes without tension it is stretched, in the water bath, at an elongation rate of 1 inch per minute. Upon reaching the desired total elongation, the sample is held at constant length for an additional 2 minutes and the water bath is removed. The load on the filament is then reduced to a value of 0.042 g.p.d. and the filament is allowed to retract. Percent recovery is calculated from the formula:

$$\frac{\text{Units of retraction}}{\text{units of elongation}} \times 100\%$$

This procedure is carried out for elongations of 0.5, 1, 2 and 3%, and a graph is prepared by plotting the percent recovery against total elongation in the range 0–3%. TSR values are average percent recovery values from the range 0–3% elongation which may be determined from the graph by usual graphical averaging procedures.

Filaments having TSR values of 60% are considered to have good tensile recovery, while filaments exhibiting TSR values of 70% and above are considered quite superior.

$TR_x$, tensile recovery from $x$ percent elongation, is a measure of the extent to which a fiber or a yarn recovers its original length after being stretched, as determined from a stress-strain curve. In this test, the sample is stretched at the rate of 10% of its test length per minute until it has reached approximately $x$ percent elongation, after which it is held at this elongation for 30 seconds and then allowed to retract at a controlled rate of 10% per minute, based on its original test length. The extension during the elongation and the recovery during retraction are measured along the elongation axis. $TR_x$ is then calculated as the percentage ratio of the amount of fiber retraction to the amount of its elongation. In the examples, $TR_3$ and $TR_5$ refer to tensile recovery from 3% and 5% elongation, respectively.

$WR_y$, work recovery from $y$ percent elongation, is a measure of the freedom from permanent realignment of the polymer molecule following stretching of the fiber or yarn. The ratio of the work done by the polymer molecule in attempting to return to their original alignment following stretching to a predetermined elongation to the work done on the sample during stretching is termed the "work recovery." The work recovery is determined from the same stress-strain curve employed to measure the tensile recovery at $x$ percent elongation. $WR_y$ is calculated as the percentage ratio of the area under the controlled relaxation curve to the area under the stretching curve. In the examples, $WR_3$ and $WR_5$ refer to work recovery from 3% and 5% elongation, respectively.

EXAMPLE 20

Preparation of polyester from trans-1,4-dimethyl-1,4-bis-(hydroxymethyl)cyclohexane and trans - 1,4-dimethyl-1,4-cyclohexanedicarboxylic acid A polymer tube is charged with 8.60 grams of trans-1,4-dimethyl - 1,4 - bis(hydroxymethyl)cyclohexane and 9.12 grams of trans-1,4-dimethyl-1,4-bis(carbomethoxy) cyclohexane. The mixture is melted and then to the tube is added 10 drops of a 12% solution of $NaHTi(OBu)_6$ in n-butyl alcohol. Ester interchange is accomplished by heating ½ hour at 210° C., ½ hour at 225° C., 1 hour at 255° C. and ½ hour at 280° C. Pressure in the tube is then reduced and polymerization continued by heating 5 hours at 280–285° C. with a pressure of 0.07 mm. of mercury and then heating 15 hours at 280–285° C. with a pressure of 1.0 mm. mercury. The polymer produced has an intrinsic viscosity of 0.78, a PMT of 240° C. and a free carboxyl content of 0.0.

The structural formula of the recurring unit of the polymer is identified as:

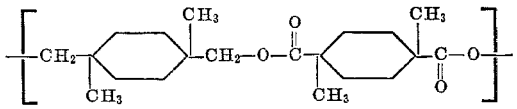

The polymer is melt-spun at 275–285° C. and then drawn 4.0× at 100° C. to give a yarn having a tenacity of 2.0 g.p.d., a break elongation of 31% and an initial modulus of 28 g.p.d.

After mock finishing and heat-setting at 180° C. the yarn is tested for recovery properties with the following results:

$WR_3/WR_5$, 40° C. wet _____ 62/59
$TR_3/TR_5$, 40° C. wet _____ 89/85
TSR, percent _____ 61

EXAMPLES 21–37

Following procedures similar to that of Example 19, a series of polyesters are prepared from 1,4-dimethyl-1,4-bis(hydroxymethyl)cyclohexane and a variety of diacids. The polymers are tested for melting point and intrinsic viscosity with the results shown in Table 2. Several of the polymers are tested for second order transition temperature ($T_g$) and others are melt-spun into yarn and tested for restrained recovery versus extension (TSR). Values of $T_g$ and TSR are also recorded in the table.

TABLE 2

| Example | Diol cis/trans ratio | Acid | PMT (° C.) | [η] | TSR (percent) | $T_g$ (° C.) |
|---|---|---|---|---|---|---|
| 21 | 35/65 | Bibenzoic acid | 300 | 1.15 | 68 | |
| 22 | 35/65 | Bis-4-carboxyphenyl sulfoxide | 234 | 0.61 | | |
| 23 | 15/85 | ____do____ | 295 | 0.65 | | |
| 24 | 0/100 | Bis-4-carboxyphenyl ether | 225 | 0.67 | | 120 |
| 25 | 35/65 | Terephthalic acid | 185 | 0.82 | | |
| 26 | 0/100 | ____do____ | 209 | 0.46 | | |
| 27 | 35/65 | Naphthalene-2,6-dicarboxylic acid | 276 | 0.81 | | |
| 28 | 15/85 | ____do____ | 260 | 0.73 | | 135 |
| 29 | 0/100 | 1,2-bix(4-carboxyphenyl)ethane | 250 | 0.95 | 75 | 120 |
| 30 | 0/100 | 1,4-bis(4-carboxyphenoxy)ethane | 205 | 0.97 | 71 | 100 |
| 31 | 0/100 | 1,4-bis(4-carboxyphenoxy)butane | 210 | 1.17 | 67 | 80 |
| 32 | 15/85 | Bis(4-carboxyphenoxy)-cis-p-hexahydroxylylene | 230 | 0.76 | | 105 |
| 33 | 15/85 | Bis(4-carboxyphenoxy)-trans-p-hexahydroxylylene | 290 | 0.77 | | |
| 34 | 35/65 | 1,4-bicyclo[2.2.2]octane dicarboxylic acid | 215 | 0.61 | | 130 |
| 35 | 15/85 | ____do____ | 270 | 0.30 | | |
| 36 | 0/100 | ____do____ | 305 | 0.23 | | |
| 37 | 0/100 | Terephthalic acid/isophthalic acid (85/15) | 192 | 0.69 | | |

EXAMPLE 38

To illustrate hydrolytic stability, three of the polymers described above are subjected to a test in which the loss in weight is measured after boiling for 3 hours in 3% sodium hydroxide solution. The results are shown in the following table, which also includes the value obtained for polyethylene terephthalate in the same test. The superior performance of the polyesters of this invention is obvious from an inspection of the data.

TABLE 3

| Source of polymer: | Weight loss, percent |
| --- | --- |
| Example 21 | 0.5 |
| Example 22 | 1.9 |
| Example 24 | 0.0 |
| Polyethylene terephthalate | 55.8 |

EXAMPLE 39

The polyester of Example 30 is melted and spun into yarn at a temperature of 262° C. Remarkable thermal stability is shown by the fact that the polymer suffers no detectible loss in intrinsic viscosity during spinning and, when analyzed for free carboxyl groups, shows carboxyl values of 0.0 for both polymer and yarn.

EXAMPLE 40

Polyamide of 1,4-dimethyl-1,4-cyclohexanedicarboxylic acid and hexamethylenediamine A stoichiometrically balanced nylon salt is prepared from hexamethylenediamine and 1,4-dimethyl-1,4-cyclohexanedicarboxylic acid, sealed in a polymer tube and heated to a temperature of 280° C. for 3 hours. The product at this point has an inherent viscosity of 0.28, measured in sulfuric acid. The product is further polymerized in the solid phase for 15 hours at a temperature of 285° C. in an atmosphere of steam. The final product has an inherent viscosity of 1.03, measured in sulfuric acid, and a melting point of 372° C. by differential thermal analysis.

The polymeric product is then melt-spun using a press spinner at 390° C. to give a yarn which has an inherent viscosity (sulfuric acid) of 0.84 and which can be drawn 5.3× at a temperature of 210° C.

To illustrate stability, a polyamide prepared as above, except not exactly stoichiometrically balanced, is heated in a steam atmosphere at 325° C. for a period of 8 hours and found to suffer no change in inherent viscosity. The polymer is then heated under nitrogen for 55 hours at 255° C. and gives no sign of gelation. Further heating at 285° C. under nitrogen for 24 hours still gives no sign of gelation. This is remarkable when it is realized that a polyamide prepared from hexamethylenediamine and unsubstituted 1,4-cyclohexanedicarboxylic acid will show extensive gelation when heated under these conditions.

The inherent viscosity ($\eta_{inh}$) is equal to $ln \eta r/c$ where $c$ is 0.5 g. polymer per 100 ml. solvent.

EXAMPLE 41

Polyurethane from hexamethylene diisocyanate and DMeHPXG

Hexamethylene diisocyanate, 5.04 g., and 5.16 g. 1,4-dimethyl-1,4-bis(hydroxymethyl)cyclohexane are reacted in 150 cc. of refluxing, stirred chlorobenzene. After 5 hours, the reaction mixture is evaporated to dryness and the residue dissolved in methylene chloride. Water is added and the methylene chloride driven off by boiling the water. On cooling the water, a solid polyurethane product is obtained having a melting point of 116° C., [$\eta$]=0.31.

EXAMPLE 42

Polyurethane from hexamethylene bis(chloroformate) and 1,4-dimethyl-1,4-bis(amino methyl)cyclohexane Equimolar proportions of hexamethylene bis(chloroformate) in chloroform and 1,4-dimethyl-1,4-bis(amino methyl)cyclohexane are reacted in water in the presence of 1% excess NaOH under high speed stirring conditions in the presence of sodium laurylsulfate detergent. The resulting product is collected, dried, and is identified as a polyurethane.

I claim:

1. A composition of the general formula:

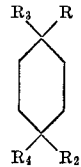

wherein R and $R_2$ are $CH_2OH$, and $R_3$ and $R_4$ are alkyl radicals having 1–4 carbon atoms.

2. A compound of claim 1 wherein both $R_3$ and $R_4$ are methyl.

3. The process which comprises reacting carbon monoxide with a compound of the general formula:

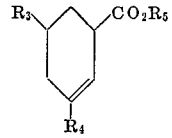

wherein $R_3$ and $R_4$ are selected from alkyl radicals having 1–4 carbon atoms and $R_5$ is selected from hydrogen and alkyl radicals having 1–4 carbon atoms, in the presence of 5 to 20 moles of concentrated sulfuric acid per mole of compound at a temperature from 20° to 50° C. and with the carbon monoxide at a pressure from 10,000 to 20,000 pounds per square inch for 30 minutes to 4 hours to form the 1,4-dialkylcyclohexane-1,4-dicarboxylic acid, esterifying the carboxyl groups of said dicarboxylic acid with a lower alkanol and then hydrogenating the dialkyl ester to form the 1,4-dialkyl-1,4-bis(hydroxymethyl)cyclohexane.

References Cited

UNITED STATES PATENTS

| | | | |
| --- | --- | --- | --- |
| 2,282,231 | 5/1942 | Mattox | 260—667 |
| 2,419,131 | 4/1947 | Ford | 260—514 CO |
| 2,448,368 | 8/1948 | Gresham et al. | 260—514 CO |
| 2,739,169 | 3/1956 | Hakemeyer | 260—497 |
| 2,818,440 | 12/1957 | Rust et al. | 260—617 |
| 2,864,858 | 12/1958 | Schneider | 260—514 CO |
| 2,872,492 | 2/1959 | Donaldson et al. | 260—667 |
| 2,917,549 | 12/1959 | Hasek et al. | 260—617 R |
| 3,113,978 | 12/1963 | Derrig et al. | 260—667 |
| 3,337,498 | 8/1967 | Hugled et al. | 260—617 R |
| 3,437,676 | 4/1969 | Kutepow et al. | 260—514 CO |
| 2,440,678 | 5/1948 | Ford et al. | 260—638 A |
| 2,986,577 | 5/1961 | Kurhajec | 260—468 R |
| 3,056,817 | 10/1962 | Werber et al. | 260—468 R |

FOREIGN PATENTS

| | | | |
| --- | --- | --- | --- |
| 942,367 | 11/1963 | Great Britain | 260—514 CO |
| 902,372 | 8/1962 | Great Britain | 260—617 R |

OTHER REFERENCES

Kundu et al., "J. Chem. Soc." (1965), pp. 2749 to 2763.
Pummerer et al., "Chem. Abstracts," vol. 49 (1955), columns 3079 to 3086.
Pummerer, "Chem. Abstracts," vol. 50 (1956), column 885.

LEON ZITVER, Primary Examiner

J. E. EVANS, Assistant Examiner

U.S. Cl. X.R.

260—75 R, 75 S, 77.5 AP, 77.5 B, 77.5 C, 77.5 CH, 78 R, 464, 468 CB, 514 C, 544, 563 R, 563 D, 557 R, 617 C

UNITED STATES PATENT OFFICE
CERTIFICATE OF CORRECTION

Patent No. 3,646,223        Dated February 29, 1972

Inventor(s) Ralph C. Schreyer

It is certified that error appears in the above-identified patent and that said Letters Patent are hereby corrected as shown below:

In Claim 3, the structure should be corrected as follows:

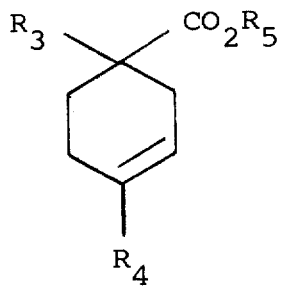

Signed and sealed this 1st day of August 1972.

(SEAL)
Attest:

EDWARD M. FLETCHER, JR.         ROBERT GOTTSCHALK
Attesting Officer               Commissioner of Patents